No. 884,881. PATENTED APR. 14, 1908.
W. T. WALTON.
BRAKE LEVER HANGER.
APPLICATION FILED MAR. 4, 1907.
2 SHEETS—SHEET 1.
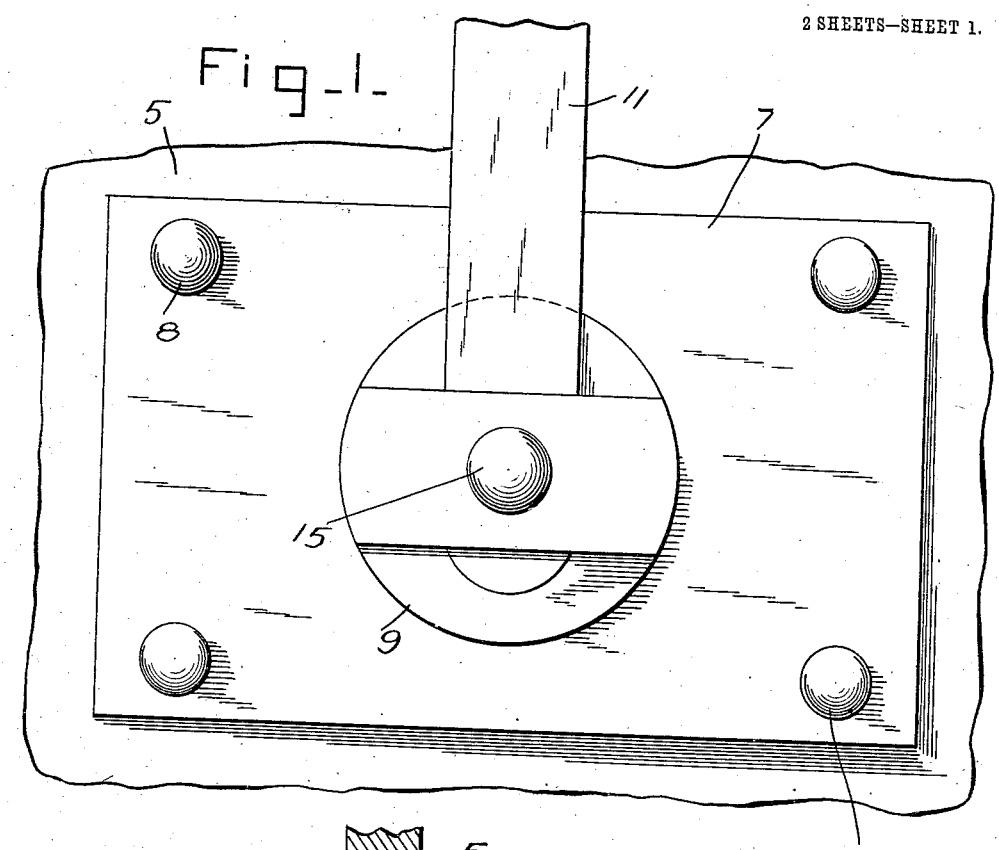
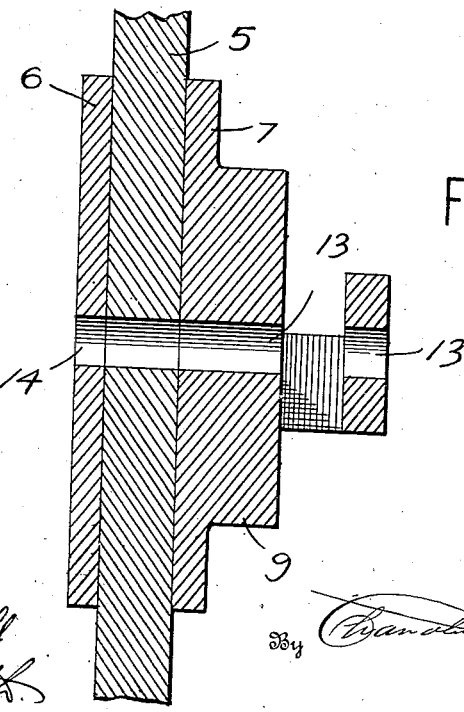
Witnesses
M. T. Rockwell
H. G. Smith
Inventor
W. T. Walton
By Chandler & Chandler
Attorneys No. 884,881. PATENTED APR. 14, 1908.
W. T. WALTON.
BRAKE LEVER HANGER.
APPLICATION FILED MAR. 4, 1907.
2 SHEETS—SHEET 2.
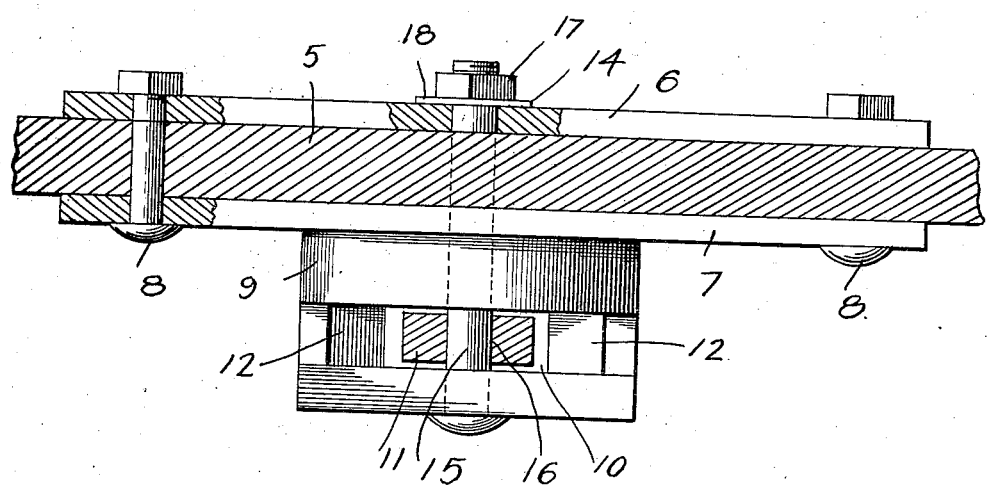
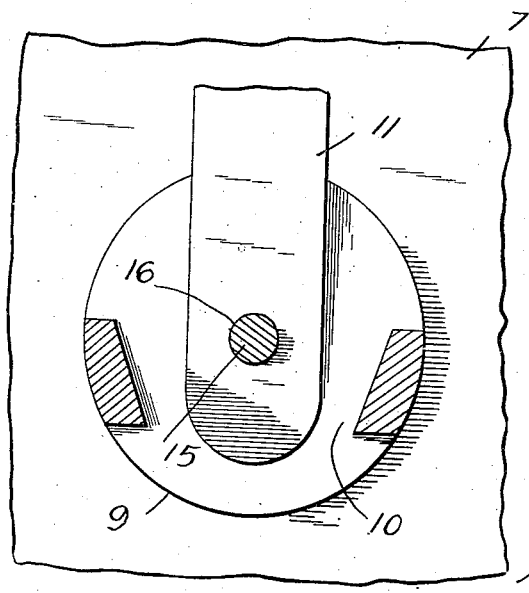

UNITED STATES PATENT OFFICE.

WILLIAM T. WALTON, OF ORLANDO, OKLAHOMA.

BRAKE-LEVER HANGER.

No. 884,881.	Specification of Letters Patent.	Patented April 14, 1908.

Application filed March 4, 1907. Serial No. 360,405.

*To all whom it may concern:*

Be it known that I, WILLIAM T. WALTON, a citizen of the United States, residing at Orlando, in the county of Logan, Oklahoma, have invented certain new and useful Improvements in Brake-Lever Hangers; and I do hereby declare the following to be a full, clear and exact description of the invention, such as will enable others skilled in the art to which it appertains to make and use the same.

This invention relates to brake lever hangers and has for its object to provide a hanger for this purpose of such construction that it will be practically impossible for the pivot bolt for the lever to pull out of its seat in the side board of a wagon. Up to the present time I am not aware of any hanger of this class which will prevent such an occurrence and hence I have designed my invention with the object in view of overcoming this liability of the pivot bolt for the lever becoming unseated.

Broadly speaking my invention resides in the provision of a pair of plates one of which is disposed on the outer side of one of the side boards of the wagon bed and the other upon the inner side thereof, these plates being held in position by means of bolts which are engaged therethrough and through the said side boards. Upon the first mentioned plate there is integrally formed a socket for the reception of the lower end of the brake lever and this socket has openings formed in its walls for the passage of the pivot bolt for the lever, this bolt being also engaged through the wagon side boards and the inner plate of the device.

In the accompanying drawings, Figure 1 is a side elevation of a portion of a wagon bed side board showing the application of my invention, Fig. 2 is a top plan view thereof, the side board being shown in section and one corner of each plate being broken away, Fig. 3 is a detail vertical transverse sectional view through the socket, and, Fig. 4 is a detail vertical longitudinal sectional view therethrough.

Referring more specifically to the drawings there is shown the side board 5 of a wagon or other vehicle and a pair of plates one of which is indicated by the numeral 6 and the other by the numeral 7, the first mentioned plate being disposed against the inner face of the side board 5 and the last mentioned plate against the outer face thereof. A bolt 8 is engaged through each corner of the plates 6 and 7 and through the side board 5 and these bolts serve to secure the plates to the side boards upon opposite sides thereof as clearly shown in the drawings.

Formed upon the outer face of the plate 7 is a block 9 in which is formed a slot or socket 10 for the reception of the pivoted lower end of a brake lever 11. This socket opens through the upper and lower ends of the block 9 and the upper end of the socket is of greater length than is the lower end, the side walls of the socket being located in parallel planes and the ends of the walls in upwardly diverging planes as indicated by the numeral 12.

Formed through the side walls of the socket are openings 13 and an opening 14 is formed in the plate 6, the pivot bolt 15 for the lever 11 being engaged through these openings 13 and 14 and through an opening 16 in the lever, there being a nut 17 engaged upon the bolt and bearing against a washer 18 which is interposed between the nut and the inner face of the plate 6.

From the foregoing description of my invention it will be observed that a very substantial hanger is provided for the lever thereby and that before the bolt 15 can leave its seat, both of the plates 6 and 7 must be fractured as must also the block 9 which is of course practically impossible even with the maximum strain which may be placed upon the bolt under the ordinary conditions.

What is claimed is—

The combination with the side board of a wagon body, of a plate disposed upon each side of the board, bolts engaged through the plates and through the side board, a block formed integrally with one of the plates, said block being provided with a socket opening through its upper and lower ends and having parallel side walls and upwardly diverging end walls, a lever seated at its lower end in the socket, and a bolt engaged through the side walls of the socket, the lever, the plates, and the side board.

In testimony whereof, I affix my signature, in presence of two witnesses.

WILLIE T. WALTON.

Witnesses:
L. LOUBER,
J. F. SHORT.